United States Patent [19]

Butcher et al.

[11] Patent Number: 4,873,104
[45] Date of Patent: Oct. 10, 1989

[54] METHOD OF PRODUCING VARIEGATED EXTRUDED PRODUCTS

[75] Inventors: Ian Butcher, Guildford; Kevin P. Hillman, Cheltenham, both of Great Britain

[73] Assignee: Thomas J. Lipton, Inc., Englewood Cliffs, N.J.

[21] Appl. No.: 183,850

[22] Filed: Apr. 20, 1988

[30] Foreign Application Priority Data

Apr. 22, 1987 [GB] United Kingdom ............... 8709478
Apr. 22, 1987 [GB] United Kingdom ............... 8709479
Apr. 22, 1987 [GB] United Kingdom ............... 8709480

[51] Int. Cl.$^4$ ............................................. A23L 1/27
[52] U.S. Cl. .................................... 426/249; 425/131.1; 426/100
[58] Field of Search ............... 426/249, 100; 264/75; 425/131.1

[56] References Cited

U.S. PATENT DOCUMENTS 3,014,437 8/1961 Dutchess ..................... 425/131.1
3,147,717 9/1964 Smith ............................. 426/249
3,347,287 2/1965 Geber ......................... 425/131.1

Primary Examiner—George Yeung
Attorney, Agent, or Firm—Brumbaugh, Graves, Donohue & Raymond

[57] ABSTRACT

Variegated extruded product having multiple patterns through the body of the product, each of which pattern is a roughly concentric or spirally striped pattern and which patterns are preferably arranged in approximate symmetry. Such product can be made by feeding a first viscous product through a tube, rotationally introducing a second, different viscous product into the first one while preventing homogeneous mixing and conducting this composite stream along at least one divider arranged with one main dimension substantially in the flow direction of said stream.

2 Claims, 2 Drawing Sheets

METHOD OF PRODUCING VARIEGATED EXTRUDED PRODUCTS

Variegated or multiflavoured confections, such as ice-cream, water ice, milk ice, sorbet, sherbet, sauce and whipped cream, are known in the art and have been produced heretobefore in several different manners, such as by simultaneously extruding at least two viscous confection materials having different flavours or other properties through extrusion outlets which are rotating around a common axis of rotation. The twisted or spirally striped product may be deposited onto a moving belt as is described in EP-B No. 44 689 or into a container as is described in GB-A No. 1 076 117.

The present invention provides novel variegated extruded products and related methods and apparatus. Preferred products are food products and in particular ice confection products such as ice cream, sorbet, sherbet, milk ice, water ice and mellorine.

A product according to the invention is characterised in that it has multiple patterns through the body of the product, each of which pattern is a roughly concentric or spirally striped pattern and which patterns are preferably arranged in approximate symmetry. This symmetry may be a simple symmetry having one axis or one plane of symmetry, but also more complex symmetries are possible e.g. with two or more planes of symmetry, which planes can be parallel or crossing, or two or more parallel planes with at least one further plane crossing the parallel ones for instance at right angles.

A method is also provided of producing a variegated extruded product comprising feeding a first viscous product through a tube, rotationally introducing a second, different viscous product into said first viscous product (without causing homogeneous mixing) to form a stream of the two distinct products and conducting the stream past at least one divider in the tube which divider has one of its main dimensions substantially in the direction of flow of the stream prior to extrusion to form the product.

Preferably, the cross-section of the stream is expanded prior to its being conducted past the divider or dividers. After said expansion the stream is for example preferably substantially rectangular in cross-section to correspond with the outline of a preferred final product/package. Of course other outlines e.g. circular can be chosen for the expanded stream, depending on the outline of the final product/package.

More than one different viscous product can be introduced into the first viscous product, thereby giving especially interesting effects. For consumer effect the viscous products will normally differ optically but flavour and texture differences are also beneficial. These differences may be used separately, together or (optimally) also with optical differences.

The extruded stream is preferably cut at right-angles to its flow, e.g. by a wire, to form the product as it is extruded from the tube downstream from the divider or dividers.

Particularly attractive patterns are obtained when one or more dividers are arranged in a regular way in the stream such as through its centre line. If multiple dividers are used, a cross-shaped arrangement, a parallel arrangement and a combination thereof are suitable. Of course other interesting variegated products, not necessarily with symmetrical patterns, can be made by using dividers with other shapes, e.g. circular or zig-zag in cross-section.

The invention also provides an apparatus for manufacturing variegated extruded products comprising an extrusion tube fed by a first and at least a second conduit, at least part of said such second conduit in the tube being rotatable about an axis which is preferably centrally disposed in the tube, and at least one divider arranged downstream of the second conduit with one main dimension substantially in the main direction of the tube. Preferably, the cross-section of the tube increases shortly before the position of the divider, considered in a downstream direction. The divider, or baffle, can conveniently be a piece of metal plate.

For a better understanding of the present invention, reference may be made to the accompanying drawings in which FIG. 1 is a cross-sectional view of an extruded product according to the invention in a simple embodiment thereof;

An extrusion apparatus (nozzle) 1 according to the present invention comprises a tube 2 in which a hollow shaft 3 is rotatably mounted in sealing bearings 4. The shaft is perforated between the bearings. At one end it is provided with driving means and at the other end with hollow vanes 5 communicating with the hollow shaft and opening at their ends remote from the shaft. The vanes 5 are rotatable with a little play inside the tube 2.

Figure 5:
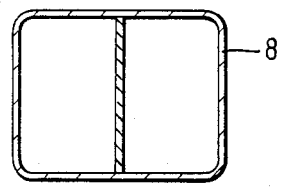
FIG. 5 is a partial cross-sectional view taken along the line V—V in FIG. 2.
Figure 6:
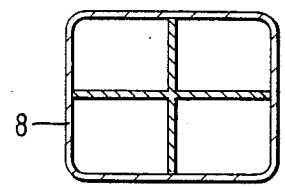
FIGS. 6 to 10 are further examples of dividers in a sectional view similar to FIG. 5.
Figure 7:
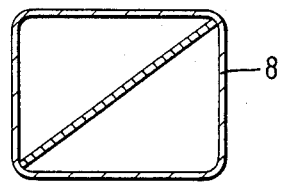
Figure 8:
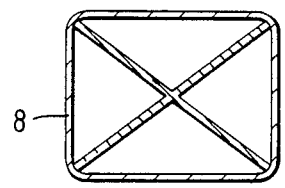
Figure 9:
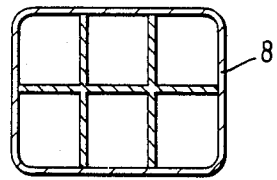
Figure 10:
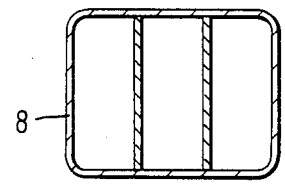

A feeding conduit 6 communicates with the tube 2 between the bearings 4 and a second feeding conduit 7 between one bearing and the vanes 5. Beyond the vanes the tube gradually widens to an end nozzle 8 of roughly rectangular cross-section with rounded corners to conform to a usual "rectangular" ice-cream tub. In this widened end nozzle 8 a rigid metal plate divider 9 is arranged having one main dimension in the longitudinal axis of the conduit. The other main direction is spanning the width of the rectangular cross-section as shown in FIG. 5.

FIG. 6 to 10 show different arrangements of dividers giving rise to other patterns of the material extruded through the nozzle.

Figure 1:
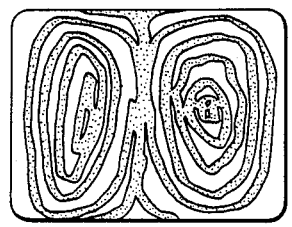
Figure 2:
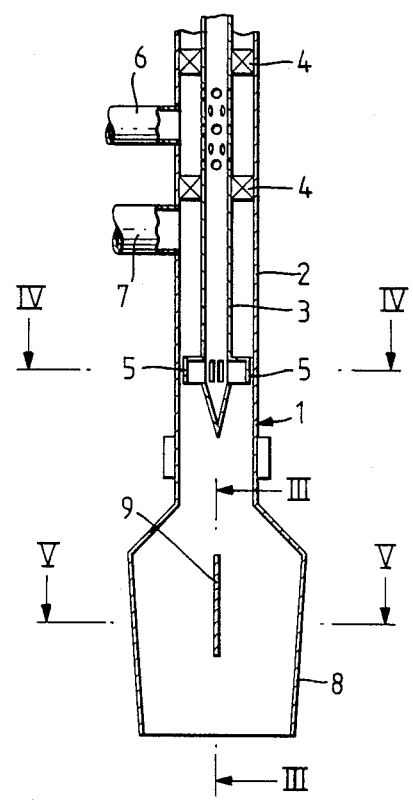
FIG. 2 is a vertical section of an apparatus according to the invention for making the product of FIG. 1.
Figure 3:
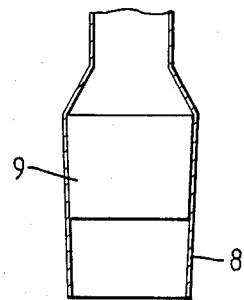
FIG. 3 is a partial sectional view taken along the line III—III in FIG. 2.
Figure 4:
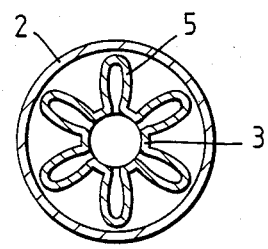
FIG. 4 is a cross-sectional view taken along the line IV—IV in FIG. 2.

The pattern of the product obtained by the nozzle depicted in FIGS. 2 to 5 is schematically shown in FIG. 1.

Preferred viscous products are viscous aerated products such as ice-cream, sorbets etc. Sorbets are particularly useful as viscous products to be introduced rotationally, i.e. to form the pattern. However, it should be noted that non-aerated products can be used e.g. sauces. Indeed, the invention is not limited to foodstuffs.

To make, for example, an ice cream product patterned with a differently coloured sorbet, ice cream is fed through feeding conduit 7 to tube 2 and a differently coloured sorbet is fed through feeding conduit 6, hollow shaft 3 and hollow vanes 5. The hollow shaft is rotated at 40/50 r.p.m. The end of the widened end nozzle 8 is suitably blocked in a customary manner to help establish continuous, full flow. When this has been achieved, portions of the extrudate are cut off as they leave the apparatus and are packaged and hardened in a conventional manner in "rectangular" tubs, which in horizontal outline conform to the horizontal cross-section of the end nozzle 8. The cross-section of the extrudate obtained in this manner is shown in FIG. 1.

We claim:

1. A method of producing a variegated extruded product comprising feeding a first viscous product through a tube, rotationally introducing a second, different viscous product into said first viscous product, while preventing homogeneous mixing, to form a stream of the two distinct products and conducting this stream along at least one divider in the tube, which divider has one of its main dimensions substantially in the direction of flow of the stream prior to extrusion to form the product.

2. A method according to claim 1, wherein multiple dividers are arranged in the tube.

* * * * *